United States Patent Office 3,644,458
Patented Feb. 22, 1972

3,644,458
β-HALOGENOALKYL ISOCYANATES
Klaus-Dieter Kampe, Frankfurt am Main, Germany, assignor to Farbwerke Hoechst Aktiengesellschaft vormals Meister Lucius & Bruning, Frankfurt am Main, Germany
No Drawing. Filed May 7, 1968, Ser. No. 727,347
Claims priority, application Germany, May 9, 1967,
F 52,364
Int. Cl. C07c 119/04
U.S. Cl. 260—453 AL 1 Claim

ABSTRACT OF THE DISCLOSURE

β-Halogenoalkyl isocyanates of the formula

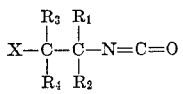

in which X represents a chlorine or bromine atom, $R_1$, $R_2$, $R_3$ and $R_4$ represent hydrogen atoms or saturated or unsaturated aliphatic, cycloaliphatic, araliphatic, aromatic or heterocyclic radicals are prepared by reacting a lactam of the formula

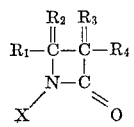

in which X, $R_1$, $R_2$, $R_3$ and $R_4$ are defined above, in the presence of an olefine and/or an acetylene with a radical-forming catalyst. The reaction products are intermediates for the manufacture of compounds used in the field of plant protection, synthetic materials and textile finishing.

---

The present invention relates to β-halogenoalkyl isocyanates especially β-bromoalkyl isocyanates and to a process for their manufacture. It relates especially to such isocyanates of the general formula

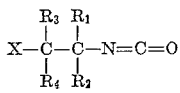

in which X represents a chlorine or, preferably, bromine atom, $R_1$, $R_2$, $R_3$ and $R_4$ represent hydrogen atoms or saturated or unsaturated aliphatic, cycloaliphatic, araliphatic, aromatic or heterocyclic radicals with up to 18, preferably up to 13 carbon atoms, which may be substituted by radicals which are inert towards isocyanate groups, such as halogen atoms, carboalkoxy-, cyano-, nitro-, alkoxy- or aryloxy groups, and each two of the radicals $R_1$, $R_2$, $R_3$ and $R_4$ together may be part of a carbocyclic or heterocyclic ring.

It is known from French Pat. No. 1,340,810 to react β-amino alcohols with chlorocarbonic acid ethyl ester to obtain the β-hydroxyalkylethyl urethane, which is converted with thionyl chloride into β-chloroalkyl ethyl urethane and which yields after a treatment with phosphorous pentachloride the β-chloroalkyl isocyanates.

Surprisingly it has now been found that β-halogenoalkyl isocyanates of the general formula

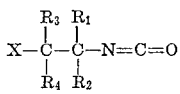

in which X represents a chlorine atom, preferably a bromine atom, $R_1$, $R_2$, $R_3$, and $R_4$ represent hydrogen atoms or saturated or unsaturated aliphatic, cycloaliphatic, araliphatic, aromatic or heterocyclic radicals with up to 18, preferably up to 13 carbon atoms, which may be substituted by radicals inert towards isocyanate groups, such as halogen atoms, carboalkoxy, cyano, nitro, alkoxy or aryloxy groups, and each two of the radicals $R_1$, $R_2$, $R_3$ and $R_4$ may together be part of a carbocyclic or heterocyclic ring, can be prepared when treating N-bromo-β-lactams or N-chloro-β-lactams of the general formula

in which X, $R_1$, $R_2$, $R_3$ and $R_4$ have the meanings given above, in the presence of an olefine and/or an acetylene, if desired with a solvent which is inert towards the isocyanate group or a mixture thereof, with radicals forming catalysts, at a temperature in the range of from about −30° C. and +250° C., preferably from about +10° and about +150° C. Due to a rearrangement reaction according to the present process the formation of the isocyanates of Formula I from the lactams of Formula II takes place under the action of the radical donators.

For the process of the present invention there may be used all compounds which have a β-lactam ring and which are substituted at the nitrogen atom of the lactam group by a bromine or chlorine atom. Excluded are such β-lactams which contain in their molecule groups which could react with the isocyanate group which is formed during the rearrangement, such as for example hydroxy or amino groups.

The N-halogen-β-lactams are obtained from the corresponding lactams according to known methods, for example by direct halogenation in aqueous solution (cf. B. Taub and J. B. Hino, J. Org. Chem. 25 (1960) 263; G. Caprara u.a., Ann. Chimica 49 (1959) 1167).

In order to explain more clearly the β-lactams which are appropriate for the process of the present invention where each two of the above stated radicals $R_1$, $R_2$, $R_3$ and $R_4$ may be part of rings or ring systems, the following β-lactams of Formulae III through VIII are given without restricting thereby the β-lactams of this type used as starting substances.

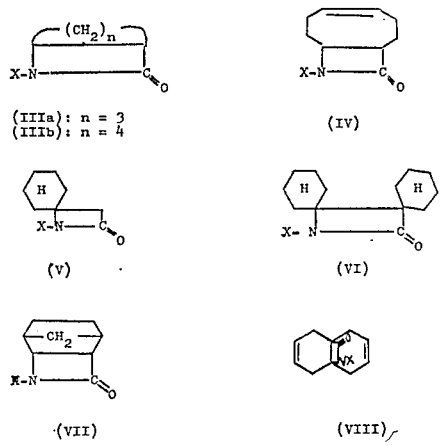

Moreover, there may be used dilactams, for example of the following Formulae IX and X:

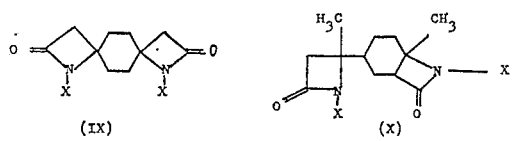

The β-lactams taken as basic substances can be prepared according to known methods, for example from the corresponding olefines and N-carbonyl-sulfamide acid chloride (cf. G. Graf, Angew. Chem. 80 (1968) 179, especially 183–185; Angew. Chem. Int. Ed. 7 (1968) 172). Thus there may be used as olefines especially $\alpha,\alpha$-disubstituted, $\alpha,\alpha,\beta$-trisubstituted and tetra-substituted monoenes, but also aromatic substituted olefines of the styrene type. Moreover, there are suitable especially bicyclic and polycyclic mono- and polyenes, as well as allenes, $\alpha$-substituted and $\alpha,\beta$-disubstituted monoenes. Furthermore there are appropriate heterocyclic compounds, such as vinyl pyridine, 1-methyl-4-vinyl-imidazol, 2-isopropenyl-tetrahydrofurane, 7-oxabicyclo[2,2,1]heptadiene-2,5 or 7-oxabicyclo[2,2,1]hepta-2-en-5,6-bis-carboxylic acid methyl ester, or 2,5-dihydrothiophen-dioxide ("sulfolene").

$\beta$-Lactams which are of particular advantage in the present invention are for example the N-bromo derivatives of 4-alkyl-, 4-(mono-chloroalkyl)-, 4-(mono-bromoalkyl)-, 3,4-dialkyl-, 4,4-dialkyl-, 4,4-di-(monochloroalkyl)-azetidinones-(2), the alkyl radicals of which may consist of 1 to 4 carbon atoms, as well as 4-vinyl-azetidinone-(2) and the compounds of Formulae IIIa, IIIb and VII.

For the procedure of the rearrangement of the present invention, compounds which contain one or more C—C multiple bonds are necessary as cocatalysts. If there are already C—C multiple bonds in the $\beta$-lactam starting substances of Formula II it is not necessary to add olefines or acetylenes. In principle all olefines and/or acetylenes may be used as cocatalysts which have one or several C—C double bonds and/or C—C triple bonds but no functional groups which would react with isocyanate groups. It is suitable to use olefines having a simple structure and which are accessible without great technical expenditure, such as for example ethylene, acetylene, propene, butene-(1), butene-(2), 4-methylpentene-(1), butadiene, isoprene, allyl chloride, allyl bromide, methallyl chloride, vinyl chloride, vinyl ethyl ether or vinyl acetate or mixtures of these olefines. Another reason for the suitability of these olefines is the possibility to separate them easily from the isocyanates by fractional distillation—if desired together with a solvent—at relatively low temperatures, considerably below the boiling point of the isocyanates which have formed.

As radical forming catalysts there may be used in the process of the present invention all compounds which decompose, while forming radicals, at temperatures in the range of from $-30°$ to $+250°$ C., preferably $+10°$ and $+150°$ C. Such radical formers preferred in the process of the present invention are for example organic peroxides and/or hydroperoxides, hydrogen peroxide, inorganic peroxide compounds and/or bisazo-isobutyronitrile. Appropriate organic peroxides are for example ditert.-butyl peroxide, dibenzoyl peroxide, dilauroyl peroxide, diisopropyl - percarbonate, ter-butyl-hydroperoxide, cumyl-hydroperoxide, pinane-hydroperoxide, tert.-butyl perbenzoate and methyl ethyl ketone-peroxide.

It is of advantage to effect the rearrangement reaction of the N-bromo- or N-chloro-$\beta$-lactams in the presence of a solvent which is inert towards the isocyanate group. Especially suitable solvents are carbon tetrachloride, chloroform, methylene chloride, 1,2-dichloroethane, symmetric difluorotetrachloroethane, tetrachloroethylene and 1,4-dichlorobutane, or mixtures of these compounds. If the process of the invention is carried out in solution at temperatures above 100° C. it is advantageous to use as solvents hydrocarbons or ethers with a higher boiling point, such as for example dioxane or diglycol-dimethyl ether.

The preparation of the isocyanates of the present invention is extremely simple. The N-bromo-azetidinone-(2) or the N-chloro-azetidinone-(2) of Formula II is left for a period of about 30 minutes to several days at an appropriate reaction temperature, preferably between $+10°$ and $+150°$ C., in the presence of catalytic amounts of the radical donator and under the addition of an olefine and/or acetylene as cocatalyst—preferably in the presence of one of the solvents mentioned above. The reaction velocity of the rearrangement reaction under formation of the $\beta$-bromo- or $\beta$-chloro-alkyl-isocyanates of Formula I rises with the reaction temperature, with the amount of catalysts and with the concentration of the olefine or acetylene component. The velocity of the rearrangement of the different N-bromo- and N-chloro-$\beta$-lactams is different. In general, the N-chloro-$\beta$-lactams rearrange much slower than the corresponding N-bromo-compounds. But it is also the substitution degree of the $\beta$-lactam ring which influences the rearrangement velocity. N-bromo- or N-chloro-$\beta$-lactams, for example, which are substituted in 3-position, rearrange much better than compounds which are unsubstituted in this position. When choosing the reaction temperature it is of advantage to consider the thermal stability of the N-bromo- or N-chloro-$\beta$-lactams. These compounds are more or less thermally sensitive; in general, the N-chloro-compounds are thermally more stable than the corresponding N-bromo-compounds. The thermal stability rises with the elevation of the degree of substitution of the N-bromo- or N-chloro-$\beta$-lactam.

Because of the aforementioned influences the optimum conditions for the rearrangement of the present invention for the different N-bromo- and N-chloro-$\beta$-lactams of Formula II are very different; they are within a large range of temperature and require reaction times of different length.

After the rearrangement reaction, the solvent or the solvents, if present, are suitably removed by distillation in vacuo and the reaction products are subjected to a fractional vacuum distillation. In some cases different amounts of a solid by-product are obtained in the rearrangement reaction. In such cases the solvent, which may be present, is evaporated under normal or reduced pressure, the residue is digested with an ether which is liquid at room temperature and which has a low boiling point or with a $C_5$–$C_7$ hydrocarbon and the solution is filtered with suction from the solid substance. The isocyanates formed are then in solution and are obtained in pure form by fractional distillation.

The radical forming catalysts used in the process of the present invention are advantageously used in quantities of 0.002 to 0.2 molar percent, referred to the N-bromo- or chloro-$\beta$-lactam quantity of Formula II.

The olefines and/or acetylenes necessary for the process are suitably introduced in quantities of 0.02 to 3 moles per mole of N-bromo- or N-chloro-$\beta$-lactam of Formula II. If the process is carried out without solvents, it is suitable to add the required C—C-unsaturated compound in quantities of 0.3 to 3 moles per mole of N-bromo- or N-chloro-$\beta$-lactam. When carrying through the process in the presence of the solvents described above, the amount of solvents used per mole of N-bromo- or N-chloro-$\beta$-lactam is, in principle, not limited. It is suitable to use the solvents in quantities of 0.3 to 50 parts by weight per part by weight of the N-bromo- or N-chloro-$\beta$-lactam to be rearranged.

The process of the present invention for preparing isocyanates of Formula I which is very simple in its practical application compared with the known isocyanate syntheses shows a distinct difference as to the methods hitherto described.

The field of application of the entirely novel process for the transposition of N-bromo- and N-chloro-azetidinones-(2) is very wide. The present invention allows to prepare a great number of isocyanates in a simple way and in one reaction stage which hitherto have been very difficult to obtain or which could not be obtained at all.

The process of the present invention opens a great number of possibilities for new syntheses by the bromine or chlorine atom which is in $\beta$-position to the isocyanate group, thus considerably enlarging the manifold reaction ways which can be carried out with the isocyanate group. The β-bromo- and β-chloroalkyl-isocyanates obtainable according to the process of the present invention thus present valuable intermediate products which can be used in many different ways, among others for the manufacture of compounds used in the field of plant protection and synthetic materials.

The reaction products can furthermore be converted by means of alcohols into the corresponding urethanes which, according to Katchalski, J. Org. Chem. 15 (1950) 1067, enter easily thermal cyclization under separation of alkyl halides to form the 2-oxazolidones, which again react by means of formaldehyde to form the 3-methyloloxazolidone-2 which can be used for textile finishing. The reaction with β-bromoalkyl isocyanates takes place in a single reaction stage.

The reaction of β-chloroalkyl isocyanates with primary amines, which is known from French Pat. No. 1,340,810, yields the corresponding ureas which can be converted into the 2-amino-oxazolines after being isolated. Compared to this, the analogous reaction with the new β-bromo-alkyl isocyanates takes place in an extremely simple way in one reaction step, so that the cumbersome and high-loss isolation of the ureas is no longer necessary.

EXAMPLE 1

The following examples serve to illustrate the invention but they are not intended to limit it thereto.

164 g. of 1-bromo-4-methyl-azetidinone-(2), 700 ml. of chloroform, 200 ml. of 1,2-dichloroethane, 130 ml. of methyl chloride and 80 mg. of dibenzoyl peroxide are mixed and boiled for 24 hours at reflux, the temperature of the reaction mixture adjusting itself to 64° C. The reaction mixture is then concentrated in vacuo, advantageously in a rotating evaporator, at a bath temperature of 40° C. and the residue is distilled in vacuo. About 110 g. (67% of theory) of β-bromo-isopropyl-isocyanate are obtained; boiling point: 52° C. under 9–9.5 mm. of mercury, $n_D^{20}$: 1.471.

Elementary composition in percent: C 29.6; H 3.7; N 8.7; Br 49.2.
Calculated for $C_4H_6BrNO$: C 29.3; H 3.7; N 8.5; Br 48.7.
Molecular weight: 164.02; molecular weight found: 163.

EXAMPLE 2

A mixture of 658 g. of unpurified 1-bromo-4-methyl-azetidinone-(2) which is obtained by bromination of 4 moles (340 g.) of 4-methylazetidinone-(2), 1,200 ml. of chloroform, 400 ml. of methylene chloride, 188 g. of allyl chloride and 300 mg. of dilauroyl peroxide are boiled for 17 hours at reflux at an internal temperature of 57° C. The reaction mixture is subsequently subjected to fractional distillation over a column in vacuo. The β-bromo-isopropyl isocyanate which has formed distills over in gas-chromatographically pure form at 14 mm. Hg, at 58° C. 538 g. (82% of theory, referred to the 4-methyl-azetidinone-(2) used as starting substance) of pure β-bromoisopropyl isocyanate (comp. data cf. Example 1) are obtained.

EXAMPLE 3

A mixture consisting of 32.8 g. of 1-bromo-4-methyl-azetidinone-(2), 20 ml. of allyl chloride and 50 mg. of cyclohexane-sulfonyl-acetyl peroxide is left for 2 days at 10° C., then further 20 mg. of the cited peroxide are added and the mixture is left for another 2 days at 10° C. The allyl chloride is subsequently evaporated in vacuo at a bath temperature of 40° C. and the rest is distilled in vacuo according to the method described in Example 2. The distilled β-bromo-isopropyl-isocyanate is then purified by fractional distillation. 9 g. of pure isocyanate are obtained (28% of theory).

EXAMPLE 4

A mixture consisting of 328 g. of 1-bromo-4-methyl-azetidinone-(2), 400 ml. of chloroform, 250 ml. of methylene chloride, 57 ml. of allyl chloride and 180 mg. of dilauroyl peroxide is heated for 30 hours to 55° C. Working up is proceeded as described in Example 2. After redistillation, 220 g. (67% of theory) of pure β-bromo-isopropyl-isocyanate are obtained.

EXAMPLE 5

A mixture consisting of 32.8 g. of 1-bromo-4-methyl-azetidinone-(2), 150 ml. of n-hexane, 10 ml. of allyl chloride and 40 mg. of dilauroyl peroxide is heated for 24 hours under reflux. Working up is then proceeded as described in Example 2. After redistillation of the crude isocyanate, 18 g. of pure β-bromo-isopropyl-isocyanate (55% of theory) are obtained.

EXAMPLE 6

A mixture of 82 g. (0.5 mole) of 1-bromo-4-methyl-azetidinone-(2), 250 ml. of chloroform, 9.4 g. (0.123 mole) of allyl chloride and 40 mg. of dibenzoyl peroxide are boiled for 18 hours under reflux, the temperature of the reaction mixture adjusting itself to 66° C. Working up is proceeded as described in Example 2. 45 g. (55% of theory) of pure β-bromo-isopropyl-isocyanate are obtained.

EXAMPLE 7

A mixture of 98. g. (0.6 mole) of 1-bromo-4-methyl-azetidione-(2), 42 g. (1 mole) of propene, 300 ml. of carbon tetrachloride and 30 mg. of dilauroyl peroxide are heated for 20 hours to 55° C. in an autoclave. Working up is then proceeded as described in Example 2. 34 g. (35% of theory) of β-bromo-isopropyl-isocyanate are obtained.

EXAMPLE 8

Into a mixture of 98 g. (0.6 mole) of 1-bromo-4-methyl-axetidinone-(2), 300 ml. of carbon tetrachloride and 80 mg. of dilauroyl peroxide, propene is slowly introduced bubble by bubble, while stirring, during 8 hours at 55° C. When the saturation concentration of propene is reached, the excess propene is led off. The reaction mixture is then worked up as described in Example 2. After distilling twice 59 g. (60% of theory) of pure β-bromo-isopropyl-isocyanate are obtained.

EXAMPLE 9

A mixture of 32.8 g. of 1-bromo-4-methyl-azetidinone-(2), 150 ml. of toluene, 15 g. of methacrylic acid methyl ester and 40 mg. of tert.-butyl perbenzoate is heated for 20 hours to the boiling point. Working up is then proceeded as described in Example 2. After redistillation, 15 g. (46% of theory) of β-bromo-isopropyl-isocyanate are obtained.

EXAMPLE 10

A mixture of 32.8 g. of 1-bromo-4-methyl-azetidinone-(2), 150 ml. of carbon tetrachloride, 18 g. of diphenyl acetylene and 0.15 ml. of hydrogen peroxide (30% strength) is heated to the boiling point for 15 hours, the temperature of the reaction mixture adjusting itself to 83° C. By means of a rotating evaporator the solvent is then evaporated in vacuo and the residue is distilled in vacuo. 20 g. (60% of theory) of β-bromo-isopropyl-isocyanate are obtained. By recrystallization from ethanol 70% of the diphenyl acetylene introduced are regained from the distillation residue.

EXAMPLE 11

A mixture of 89 g. of 1-bromo-4-ethtyl-azetidinone-(2) (0.5 mole), 200 ml. of chloroform, 91 g. of allyl chloride (1.2 mole) and 80 mg. of dilauroyl peroxide is heated for 24 hours under reflux, the temperature of the reaction mixture being 61° C. Working up is then proceeded as described in Example 2. 53 g. (59% of theory) of 1- ethyl-2-bromo-ethyl-isocyanate are obtained. Boiling point: 68–68.5° C. under 10 mm. of mercury, $n_D^{20}$: 1.472;

Elementary composition in percent: C 34.0; H 4.5; N 8.1; Br 46.0;
Calculated for $C_5H_8BrNO$: C 33.7; H 4.5; N 7.9; Br 44.9;
Molecular weight: 178.04; molecular weight found: 177.

In analogous manner there is obtained from 1-bromo-4-n-decyl-azetidinone-2 the 1-n-decyl-2-bromo-ethyl-isocyanate in a yield of 70%. Boiling point: 105–110° C. under 0.01 mm. of mercury;

Elementary composition in percent: C 54.1; H 8.4; Br 27.9; N 4.6;
Calculated for $C_{13}H_{24}BrNO$: C 53.80; H 8.33; Br 27.53; N 4.83; O 5.51;
Molecular weight: 290.25; molecular weight found: 289.

EXAMPLE 12

A mixture of 176 g. (1 mole) of 1-bromo-4-vinyl-azetidinone-(2), 700 ml. of carbon tetrachloride, 119 g. (1.3 mole) of methylallylchloride and 80 mg. of dibenzoyl peroxide are boiled for 24 hours at reflux, the temperature of the reaction mixture being 79° C. The easily volatile part of the reaction mixture is then vaporized at the rotating evaporator in vacuo at a bath temperature of 40° C. The residue is mixed with about 400 ml. of ether and thoroughly stirred, whereby a solid product precipitates. This is filtered with suction and the filtrate is concentrated in vacuo at a bath temperature of 40° C. The remaining oily residue is then subjected to a distillation in vacuo as described in Example 2. After redistillation over a column, 98 g. (55% of theory) of 1-vinyl-2-bromoethyl-isocyanate are obtained. Boiling point: 58° C. under a pressure of 7 mm. of mercury $n_D^{20}$: 1.492;

Elementary composition in percent: C 34.0; H 3.20; N 8.10; Br 47.1;
Calculated for $C_5H_6BrNO$: C 34.1; H 3.4; N 8.0; Br 45.4;
Molecular weight: 176.04; molecular weight found: 175.

EXAMPLE 13

A mixture of 176 g. of 1-bromo-4-vinyl-azetidinone-(2), 500 ml. of carbon tetrachloride, 100 ml. of methylene chloride, and 70 mg. of dilauroyl peroxide is heated for 10 hours under reflux. Working up is then proceeded as described in Example 2. 77 g. of 1-vinyl-2-bromoethyl-isocyanate (39% of theory) are obtained.

EXAMPLE 14

A mixture of 176 g. of 1-bromo-4-vinyl-azetidinone-(2), 9.4 g. (0.12 mole) of allyl chloride, 500 ml. of carbon tetrachloride and 150 mg. of dilauroyl peroxide are heated for 24 hours to 60° C. Working up is then proceeded as described in Example 2. 94 g. (54% of theory) of pure 1-vinyl-2-bromoethyl-isocyanate are obtained.

EXAMPLE 15

A mixture of 35.6 g. (0.2 mole) of 1-bromo-3,4-dimethylazetidinone-(2), 150 ml. of carbon tetrachloride, 10.2 g. (0.15 mole) of pentine-(1) and 30 mg. of bis-azoisobutyronitrile is heated for 22 hours under reflux; the temperautre of the boiling reaction mixture is 73° C. The mixture is then concentrated in vacuo and the residue distilled in vacuo. The 1,2-dimethyl-2-bromoethyl-isocyanate once distilled is redistilled over a column and then it is obtained in pure form in a quantity of 27 g. (76% of theory). Boiling point: 62° C. under 11 mm. of mercury, $n_D^{20}$: 1.473.

Elementary composition in percent: C 33.9; H 4.6; N 8.3; Br 47.0;
Calculated for $C_5H_8BrNO$: C 33.7; H 4.5; N 7.9; Br 44.9;
Molecular weight: 178.04; molecular weight found: 177.

EXAMPLE 16

A mixture of 35.6 g. of 1-bromo-3,4-dimethyl-azetidinone-(2), 150 ml. of carbon tetrachloride, 14 g. (0.16 mole) of vinyl acetate and 30 mg. of bis-azoisobutyronitrile is boiled for 20 hours under reflux, whereupon a solid product precipitates. By filtering with suction, the solid product is separated from the solution. The filtrated solution is concentrated in vacuo at a bath temperature of 40° C. and then mixed with 200 ml. of ether, whereupon further amounts of the solid product precipitate. The solution is again filtered with suction from the solid product and again concentrated in vacuo. The oily residue is then distilled as described in Example 2. After redistillation, 22 g. (62% of theory) of 1,2-dimethyl-2-bromoethyl-isocyanate are obtained.

Examples 17 through 38 are summarized in the following table; in all cases it is the 1-bromo-3,4-dimethylazetidione-(2) which is rearranged.

TABLE I

[Rearrangements of the 1-bromo-3,4-dimethyl-azetidinone-(2) (molecular weight 178) comprising Examples 17 through 38. Working up is proceeded as described in Example 16]

| Ex. | 1-bromo-3, 4-dimethyl azetidinone-(2), moles | Olefin- or acetylene component, mole | Solvent in ml. | Reaction Time in hrs. | Reaction Temperature in ° C. | Catalyst radical donator in mg. | Yield of— $Br-CH(CH_3)-CH(CH_3)-NCO$ G. | Percent of theory |
|---|---|---|---|---|---|---|---|---|
| 17 | 0.5 | 0.74 allyl chloride | {300 CCl₄ / 150 Cl—CH₂—CH₂—Cl} | 20 | 72 | 40 dibenzoyl peroxide | 53 | 56 |
| 18 | 2 | 0.7 allyl chloride | {800 CCl₄ / 200 CH₂Cl₂} | 15 | 64 | 120 dibenzoyl peroxide | 214 | 60 |
| 19 | 0.6 | 1.5 propene | 200 CCl₄ | 24 | 62 | 50 dibenzoyl peroxide | 33 | 31 |
| 20 | 0.5 | 0.7 cyclohexene | 600 CCl₄ | 24 | 80 | 70 dibenzoyl peroxide | 40 | 44 |
| 21 | 0.2 | 0.2 isoprene | 150 CCl₄ | 6 | 72 | 30 bis-azoisobutyronitrile | 23 | 65 |
| 22 | 0.2 | 0.2 styrene | 150 CCl₄ | 18 | 77 | do | 22 | 62 |
| 23 | 0.2 | 0.15 phenyl acetylene | 150 CCl₄ | 22 | 81 | do | 15 | 43 |
| 24 | 0.2 | 0.15 vinyl-ethylether | 150 CCl₃ | 20 | 72 | do | 21 | 59 |
| 25 | 0.2 | 0.14 vinyl-ethylether | 150 CHCl₃ | 14 | 62 | 50 tert.-butylperbenzoate | 26 | 73 |
| 26 | 0.2 | do | 150 CCl₄ | 14 | 68 | 50 cumyl-hydroperoxide | 24 | 68 |
| 27 | 0.2 | do | {75 CCl₄ / 75 CHCl₃} | 14 | 66 | 100 pinane-hydroperoxide (50% ig.) | 23 | 65 |
| 28 | 0.2 | 0.14 methyl acrylate | 150 CCl₄ | 19 | 80 | 30 dibenzoyl peroxide | 18 | 51 |
| 29 | 0.2 | 0.12 allyl chloride | 150 CHCl₃ | 2.5 | 64 | 150 perhydrol (30% strength) | 23 | 65 |
| 30 | 1 | 0.35 allyl chloride | {200 CCl₄ / 200 CH₂Cl₂} | 12 | 54 | 100 dilauroyl peroxide | 134 | 76 |
| 31 | 0.2 | 0.12 allyl chloride | 150 CHCl₃ | 7 | 62 | 100 K₂S₂O₈* | 24 | 68 |
| 32 | 0.2 | do | 150 CHCl₃ | 7 | 62 | 80 sodium percarbonate* | 24 | 68 |
| 33 | 0.2 | do | 150 benzene | 17 | 64 | 30 dibenzoyl peroxide | 21 | 59 |
| 34 | 0.2 | do | 150 hexane | 17 | 64 | 30 dilauroyl peroxide | 22 | 62 |
| 35 | 0.2 | do | 150 tetrahydrofurane | 17 | 67 | 50 dilauroyl peroxide | 20 | 56 |
| 36 | 0.2 | 0.24 allyl chloride | { | 28 / 14 | 34 / 22 | 50 cyclohexanesulfonyl-acetyl-peroxide | 27 | 76 |
| 37 | 0.2 | do | 150 CHCl₃ | 120 | 20 | do | 10 | 28 |
| 38 | 0.2 | 0.12 allyl chloride | 150 CHCl₃ | 5 | 63 | 40 Na₂O₃* | 20 | 57 |

*In these examples 0.07 ml. of water was added.

EXAMPLE 39

While stirring for 2 hours at 65° C., gaseous vinyl chloride is slowly added, bubble by bubble, to a mixture of 89 g. of 1-bromo-3,4-dimethyl-azetidinone-(2), 400 ml. of carbon tetrachloride and 50 mg. of dilauroyl peroxide, then stirring is continued for another 2 hours, however, without the addition of vinyl chloride. Subsequently, the addition of vinyl chloride for 2 hours is repeated 3 times and then the whole is stirred again for 2 hours at 65° C. Working up is then proceeded as described in Example 2. After distilling twice, 39 g. (44% of theory) of 1,2-dimethyl-2-bromo-ethyl-isocyanate are obtained.

4 moles (396 g.) of 4,4-dimethyl-azetidinone-(2), 1,200 ml. of chloroform, 400 ml. of methylene chloride, 188 g. of allyl chloride and 300 mg. of dilauroyl peroxide is boiled for 40 hours under reflux at an internal temperature of 57° C. The reaction mixture is then subjected to a fractional distillation over a column in vacuo. At 9 mg. of mercury and at 52° C., 604 g. (85% of theory, referred to 4 moles of 4,4-dimethyl-azetidinone-(2) as starting substance) of gaschromatographically pure β-bromo-tert.-butyl-isocyanate are obtained.

Examples 44 through 53 are summarized in the following Table II, where the 1-bromo-4,4-dimethyl-azetidinone-(2) is rearranged.

TABLE II

[Rearrangements of the 1-bromo-4,4-dimethyl-azetidinone-(2) (molecular weight 178) comprising Examples 44 through 53. Working up is proceeded as described in Example 41]

| Ex. | 1-bromo-4,4-dimethyl-azetidinone-(2), moles | Olefin- or acetylene component, mole | Solvent in ml. | Reaction Time in hrs. | Tempera- ture in° C. | Catalyst (radical donator) in mg. | Yield of— $Br-CH-\underset{\underset{CH_3}{\mid}}{\overset{\overset{CH_3}{\mid}}{C}}-N=C=O$ G. | Percent of theory |
|---|---|---|---|---|---|---|---|---|
| 44 | 0.2 | 0.4 allyl chloride | | 240 | 5 | 100 cyclohexanesulfonyl-acetyl-peroxide. | 9 | 25 |
| 45 | 0.2 | 0.2 cyclohexene | 200 sinarol | 3 | 140 | 50 di-tert.-butylperoxide | 20 | 57 |
| 46 | 0.6 | 1.0 propene | 200 CCl$_4$ | 20 | 60 | 80 dilauroyl peroxide | 61 | 61 |
| 47 | 0.2 | 0.15 acrylonitrile | 150 CCl$_4$ | 18 | 76 | 30 tert.-butylperbenzoate | 9 | 25 |
| 48 | 0.2 | 0.1 diphenyl acetylene. | 150 CCl$_4$ | 18 | 83 | 30 dibenzoyl peroxide | 25 | 71 |
| 49 | 0.2 | 0.2 allyl chloride | 50 benzene | 120 | 35 | 250 diisopropylpercarbonate [1] | 18 | 50 |
| 50 | 0.2 | do | do | 48 | 50 | 200 methylethylketone-peroxide [2] | 22 | 62 |
| 51 | 0.2 | 0.15 mesityl oxide | 150 CHCl$_3$ | 17 | 67 | 50 dilauroyl peroxide | 18 | 51 |
| 52 | 0.2 | 0.2 allyl chloride | 450 CH$_2$Cl$_2$ | 30 | 41 | 100 sodiumborate-peroxidehydrate [3] | 12 | 34 |
| 53 | 0.5 | 1.0 isoprene | 200 CHCl$_3$ | 10 | 58 | 8 dilauroyl peroxide | 12 | 34 |

[1] A 20% solution in dibutyl maleate.
[2] A 50% solution in dimethyl phthalate.
[3] 0.07 ml. of water are added to the reaction mixture.

EXAMPLE 40

To a mixture of 41 g. of 1-bromo-4-methyl-azetidinone-(2), 200 ml. of carbon tetrachloride, 50 mg. of sodium peroxide and 2 drops of water, gaseous butadiene-(1,3) is slowly added bubble by bubble, while stirring for 6 hours at 55° C. When the saturation concentration is obtained, the excess butadiene is lead off. Working up is then proceeded as described in Example 2. After distilling twice in vacuo, 23 g. (56% of theory) of pure β-bromo-isopropyl-isocyanate are obtained.

EXAMPLE 41

While stirring at 65° C. ethylene is slowly led through a mixture of 89 g. of 1-bromo-4,4-dimethyl-azetidinone-(2), 400 ml. of carbon tetrachloride and 50 mg. of dilauroyl peroxide, bubble by bubble for 7 hours. Then, further 20 mg. of dilauroyl peroxide are added and the reaction mixture is kept for further 3 hours at 65° C. without the addition of ethylene. The reaction mixture is then concentrated in vacuo in a rotating evaporator at a bath temperature of 40° C. and then the oily residue is distilled. After redistillation over a column, 61 g. (69% of theory) of pure β-bromo-tert.-butyl-isocyanate are obtained. Boiling point under a pressure of 9 mm. of mercury: 52° C., $n_D^{20}$: 1.463;

Elementary composition in percent: C 33.4; H 4.4; N 8.1; Br 46.0;
Calculated for C$_5$H$_8$BrNO: C 33.7; H 4.5; N 7.9; Br 44.9;
Molecular weight: 178.04; molecular weight found: 177.

EXAMPLE 42

It is proceeded as described in Example 41, leading through the mixture, however, acetylene instead of ethylene. After working up and redistillation, 58 g. (65% of theory) of pure β-bromo-tert.-butyl-isocyanate are obtained.

EXAMPLE 43

A mixture of 715 g. of unpurified 1-bromo-4,4-dimethyl-azetidinone-(2), which was obtained by bromination of

EXAMPLE 54

A mixture of 90 g. (0.4 mole) of 1-bromo-4-phenyl-azetidinone-(2), 400 ml. of methylene chloride, 400 ml. of carbon tetrachloride, 73 g. (0.8 mole) of methallyl chloride and 30 mg. of dibenzoyl peroxide are heated for 5 hours to 54° C. The easily volatile substances of the reaction mixture are then evaporated in vacuo at a bath temperature of 40° C. The viscous oily residue is distilled at a pressure of 1 mg. of mercury in 3 aliquot portions in the bulb tube. A considerable amount of distillation residue remains. The collected distillates are redistilled in the bulb tube, whereupon 35 g. (39% of theory) of 1 - phenyl - 2 - bromoethyl - isocyanate are obtained. The substance distills in the bulb tube at 1 mg. of mercury at a bath temperature of 75–83° C.

Elementary composition in percent: C 47.6; H 3.5; N 6.3; Br 37.2;
Calculated for C$_5$H$_8$BrNO: C 47.8; H 3.6; N 6.2; Br 35.3;
Molecular weight: 226.08; molecular weight found: 225.

EXAMPLE 55

A mixture of 54 g. (0.4 mole) of 1 - chloro - 4,4 - di-methyl-azetidinone-(2), 400 ml. of 1,2-dichloroethane, 36.7 g. (0.4 mole) of methallyl chloride and 60 mg. of dibenzoyl peroxide are heated for 10 days to 70° C., after each day another 10 mg. of dibenzoyl peroxide are added. Working up is then proceeded as described in Example 1. After redistillation, 26 g. (48% of theory) of β - chloro - tert. - butyl - isocyanate are obtained. Boiling point under a pressure of 20 mm. of mercury: 50° C., $n_D^{20}$: 1.442;

Elementary composition in percent: C 44.8; H 6.0; N 10.6; Cl 27.2;
Calculated for C$_5$H$_8$ClNO: C 45.0; H 6.0; N 10.4; Cl 26.5;
Molecular weight: 133.58; molecular weight found: 133.

EXAMPLE 56

A mixture of 66 g. of unpurified 1 - bromo - 4 - methyl-4-n-propyl - azetidinone-(2), obtained by bromination of 0.3 mole (38 g.) of 4 - methyl-4-n-propyl-azetidinone-(2), 300 ml. of chloroform, 28 g. of allyl chloride and 60 mg. of dibenzoyl peroxide are boiled for 17 hours under reflux at an internal temperature of 61° C. The solvent and the allyl chloride are then evaporated in vacuo in a rotating evaporator and the remaining crude 1-methyl - 1 - propyl - 2 - bromoethyl-isocyanate is distilled over a column. 52 g. (84% of theory, referred to 0.3 mole of 4 - methyl-4-n-propyl - azetidinone-(2) as starting substance) of pure 1 - methyl - 1 - n - propyl - 2 - bromoethyl-isocyanate are obtained. Boiling point under a pressure of 6 mm. of mercury: 74–75° C. $n_D^{20}$: 1.468.

Elementary composition in percent: C 41.1; H 5.9; Br 39.0; N 7.1;
Calculated for $C_7H_{12}BrNO$: C 40.79; H 5.87; Br 38.78; N 6.80;
Molecular weight: 206.10; molecular weight found: 205.

EXAMPLE 57

A mixture of 150 g. of unpurified N-bromo-3,4-tetramethylene-azetidinone-(2), obtained by bromination of 89 g. (0.7 mole) of 3,4 - tetramethylene-azetidinone-(2), 200 ml. of chloroform, 65 ml. of methylene chloride, 31 g. (0.4 mole) of allyl chloride and 50 mg. of dilauroyl peroxide is heated for 20 hours under reflux at an internal temperature of 57° C. The reaction mixture is then subjected to fractional distillation in vacuo. The 1-isocyanato - 2 - bromo - cyclohexane (2 - bromo-cyclohexylisocyanate) which has formed distills over at 0.1 mm. of mercury and at 43° C. 117 g. (81% of theory referred to 3,4-tertamethylene-azetidinone-(2) as starting substance) of pure isocyanate are obtained, $n_D^{20}$: 1.5100.

Elementary composition in percent: C 41.3; H 4.9; N 7.0; Br 39.4;
Calculated for $C_7H_{10}BrNO$: C 41.20; H 4.94; N 6.86; Br 39.16;
Molecular weight: 204.07; molecular weight found: 203.

EXAMPLE 58

A mixture of 26 g. of unpurified N-bromo - 3,4- (3a'.4'.5'.6'.7'.7a' - hexahydro - 4'.7'. - methano-indeno)-azetidinone-(2)

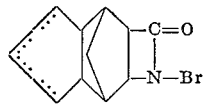

which are obtained by bromination of 0.1 mole of the corresponding lactam, 60 ml. of chloroform, 20 ml. of methylene chloride, 4.7 g. of allyl chloride and 20 mg. of dilauroyl peroxide is heated for 15 hours at 56° C. internal temperature under reflux. The solvents and the allyl chloride are then distilled off in vacuo. The isocyanate which has formed is subsequently distilled in a high-vacuum in a short-way distillation apparatus. 7 g. (28% of theory referred to 0.1 mole of the corresponding β-lactam as starting substance) of 6(5)-bromo-5(6)-isocyanato - 3a.4.5.6.7.7a - hexahydro - 4,7 - methano-indene are obtained. Boiling point under a pressure of 0.02 mm. of mercury: 116° C.; $n_D^{28}$: 1.5530; melting point: 27–28° C.

Elementary composition in percent: C, 52.2; H, 4.9; Br, 32.0; N, 5.3;
Calculated for $C_{11}H_{12}BrNO$: C, 51.99; H, 4.76; Br, 31.44; N, 5.52;
Molecular weight: 254.14; molecular weight found: 253.

EXAMPLE 59

A mixture of 217 g. of unpurified 1-bromo-4-chloromethyl - 4 - methyl-azetidinone-(2), obtained by bromination of 1 mole (133.5 g.) of 4-chloromethyl-4-methyl-azetidinone-(2), 300 ml. of chloroform, 100 ml. of methylene chloride, 47 g. of allyl chloride and 75 mg. of dilauroyl peroxide is heated for 40 hours under reflux at an internal temperature of 57° C. The reaction mixture is then subjected to fractional distilliation in vacuo. The β-chloro-β'-bromo-tert.-butyl-isocyanate passed over at 5 mm. of mercury and at 61° C. 149 g. of pure product are obtained (70% of theory, referred to 4-chloro-methyl-4-methyl-azetidinone-(2) as starting substance) $n_D^{20}$: 1.4973.

Elementary composition in percent: C, 28.0; H, 3.3; Br, 38.2; Cl, 17.0; N, 6.3;
Calculated for $C_5H_7BrClNO$: C, 28.26; H, 3.32; Br, 37.61; Cl, 16.68; N, 6.59;
Molecular weight: 212.48; molecular weight found: 211.

EXAMPLE 60

A mixture of 56 g. of unpurified N-bromo-3,3-dimethyl-azetidinone-(2), obtained by bromination of 0.3 mole (30 g.) of 3,3 - dimethyl-azetidinone-(2), 450 ml. of chloroform, 34 g. of allyl chloride and 45 mg. of dibenzoyl peroxide is boiled for 4 hours under reflux at 61° C. internal temperature. The reaction mixture is then subjected to fractional distillation in vacuo. The 2-bromo-2-methyl-propyl-isocyanate which has formed distills over at 4 mm. of mercury and at 46–47° C. 21 g. (39% of theory, referred to 0.3 mole of 3,3-dimethyl-azetidinone-(2) as starting substance) of gaschromatographically pure 2-bromo - 2 - methyl-propyl-isocyanate $$(Br—C(CH_3)_2—CH_2—NCO)$$

are obtained. $n_D^{20}$: 1.473;

Elementary composition in percent: C, 33.7; H, 4.6; Br, 44.5; N, 8.0;
Calculated for $C_5H_8BrNO$: C, 33.73; H, 4.54; N, 7.87; Br, 44.88;
Molecular weight: 178.04; molecular weight found: 177.

What we claim is:

1. 3-isocyanato-4-bromo-butene-(1).

References Cited

UNITED STATES PATENTS

| | | | |
|---|---|---|---|
| 2,887,469 | 5/1959 | Unruh et al. | 260—453 X |
| 3,297,754 | 1/1967 | Bantzes | 260—239 X |
| 3,338,944 | 8/1967 | Harper teal. | 260—453 |
| 3,437,680 | 4/1969 | Harrissery, Jr., et al. | 260—453 |
| 3,468,923 | 9/1969 | Koenig et al. | 260—453 |
| 3,483,242 | 12/1969 | Brownstein et al. | 260—453 |

FOREIGN PATENTS 1,340,810  9/1963  France.

OTHER REFERENCES

Finar: "Organic Chemistry Volume One: The Fundamental Principles," Longmans, Green and Co., London, New York, Toronto (1959).

CHARLES B. PARKER, Primary Examiner

D. H. TORRENCE, Assistant Examiner

U.S. Cl. X.R.

204—158; 260—239 A, 307 R, 453 AR, 453 A, 453 P, 465 D, 465.4, 469, 471 C, 478, 482 C, 558 R, 561 R